Patented July 21, 1931

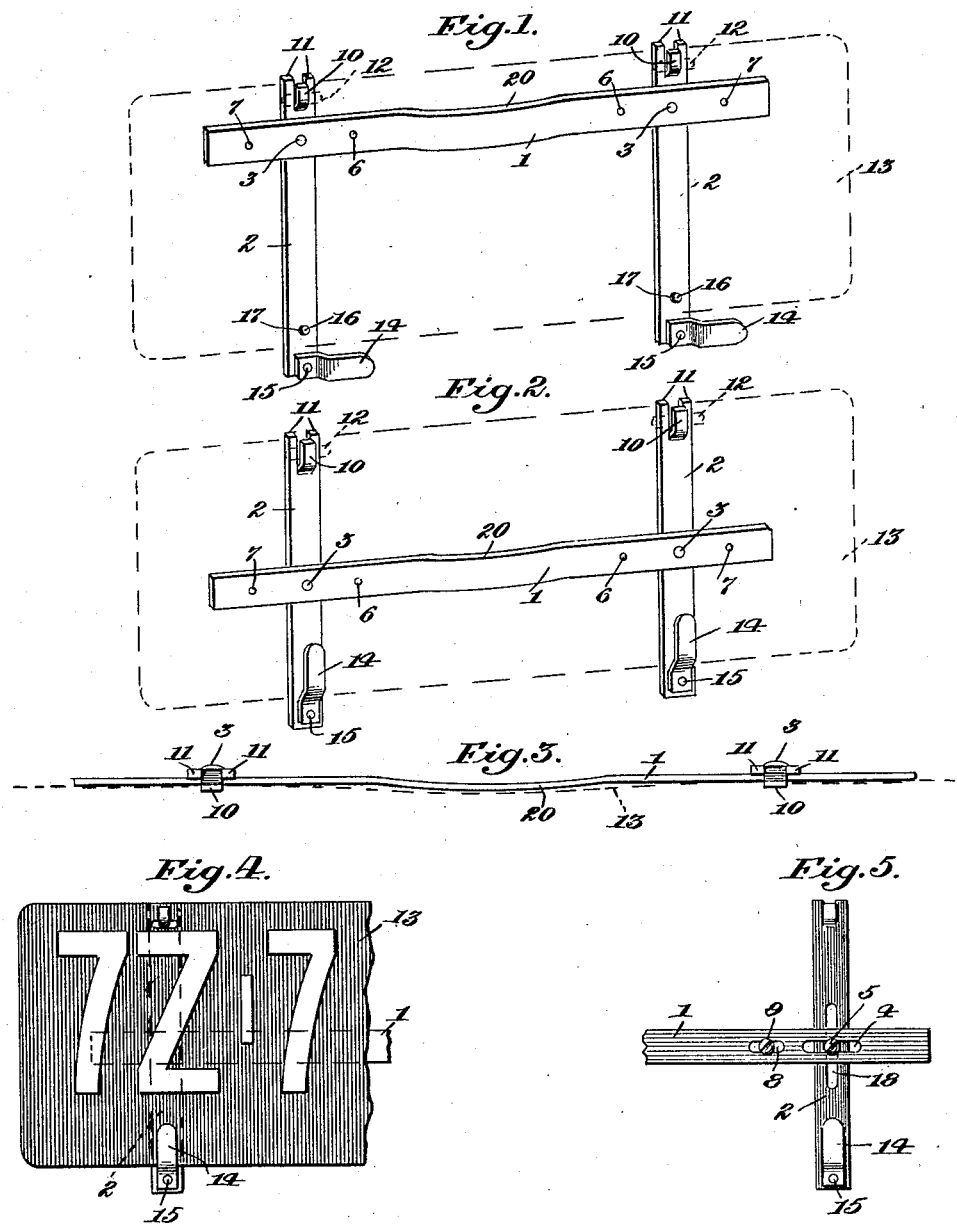

1,815,767

UNITED STATES PATENT OFFICE

LEON H. FUSMER, OF CANAJOHARIE, NEW YORK

AUTOMOBILE PLATE HOLDER

Application filed November 26, 1929. Serial No. 409,905.

This invention relates to new and useful improvements in license plate holders for automobiles or similar vehicles, and is more particularly concerned with the provision of a simple and inexpensive apparatus or combination of parts whereby the license plates may be readily and quickly mounted or demounted, on the holder, while at the same time the holder itself may be readily attached or detached from the vehicle. The invention in the broader aspect comprises a simple framework composed of longitudinal and transverse parts, preferably of metal, the said parts being suitably secured together preferably in rigid manner. On the said frame work, which is adapted to be secured to the vehicle, are one or more of each of fixed and movable lugs, adapted to cooperate with each other and with the framework, to hold the license plate in place, at the same time permitting ready demounting or interchange of plates. While the same holder is adapted at will for use on the front or rear of the vehicle, there is preferably a slightly different design of holder for the front and rear, for purposes which will be developed more fully hereinafter. It is readily understood that once the broad inventive concept has been disclosed, numerous exemplifications will occur to those skilled in the art which will form no departure from the essential spirit of the invention.

An object of my invention is to produce a new form of license plate holder.

Another object is to produce a license plate holder characterized by its simplicity and small number of parts, and low cost of production.

Another object is to produce a license plate holder which may readily be attached to and detached from a vehicle, and may be adapted, either in the absence of or with but simple modifications, to use at the front or rear of the vehicle.

Another object is to produce a license holder adaptable at will for use at either the front or rear of the vehicle.

Still another object is to produce a license plate holder to which the license plates may be readily attached or detached.

Yet another object is to produce a license plate holder comprising a simple frame work carrying at least one each of fixed and movable lugs, whereby a license plate may be clamped securely thereto.

Other objects and advantages will appear hereinafter.

In the drawings:—

Figs. 1 and 2 are perspective views of the construction, according to one form of my invention for use respectively at the front and rear of a vehicle.

Fig. 3 is a plan view of a holder, illustrating one manner in which the longitudinal portion of the frame work of the holder may be shaped with respect to the license plate, in order to more firmly secure the latter.

Fig. 4 is a fragmentary front elevation of the holder, with a license plate in position thereon, while Fig. 5 is a fragmentary elevation illustrating two possible modifications of my invention which may be employed either singly or together.

Referring more particularly to the devices illustrated in the several views, in Fig. 1 the frame work is shown as comprising a longitudinal member 1, which may be formed of any suitable material but which in the present instance is comprised of rolled or cast iron. To this longitudinal member 1 is secured one or more transverse members 2, of which two are illustrated in the drawings; and these may be secured to the longitudinal member 1 by any suitable means.

In Figs. 1 and 2 such means are illustrated as the rivets or bolts 3, while in Fig. 5 the means comprise slots 4 in the member 1 with cooperating set screws 5 threading into and seating in the members 2 or being secured in any suitable manner. The transverse members are shown in Fig. 2 as being secured to member 1 substantially at their center and adjacent the ends of the last named member while the frame work so constructed is suitable for attachment either to the front or rear of the vehicle, it is peculiarly adapted for use at the front, the member 1 being secured preferably to the tie rod connecting the front fenders and the lamps and the license plate extending vertically substantially equal distances on each side thereof, thus presenting a pleasingly balanced and symmetrical appearance, and at the same time lending an increased tendency to rigidity.

As shown in Figs. 1 and 2 the frame work is adapted to be secured to the vehicle by rivets, screws, bolts or the like passing through openings 6 or 7 arranged in the member 1 on opposite sides of the transverse members 2, or, as shown in Fig. 5 by bolts or screws 9 extending through slots 8 in the member 1.

The form of the invention illustrated in Fig. 5 is characterized by the fact that by means of the slots 8 it can be attached at various points on the rod or other portion of the vehicle, without moving the relative position of the frame work, while at the same time the members 2 can be adjusted longitudinally of the member 1 to adapt them to the slots of a particular license plate. Once adjusted, the bolts or screws can be tightened, and the frame work formed into a unitary whole.

Suitable provision is made for clamping the license plates to the holder, and in the present instance such provision takes the form of lugs formed on or struck outwardly from the upper ends of the members 2. Such lugs are shown at 10, and together with the ears 11 thus formed on members 2, are adapted to engage the slots 12 on the upper edge of a license plate shown at 13.

When the license plate is placed in position on the frame work and the slots 12 are in engagement with lugs 10, it may be clamped in place at the lower edge by means of swingable clamps 14 pivoted at the lower ends of members 2 by suitable means such as rivets or the like. When so secured the license plate is held firmly and securely in place, but at the same time may be readily demounted, merely by swinging the clamps 14 out of the way, and releasing the license plate. As an added safeguard against movement of the license plate when in its clamped position, studs 16 may be provided as shown in Fig. 1 on the lower end of the members 2 adapted to fit into and cooperate with the slots 17 at the lower end of the license plate. Such construction is illustrated in Fig. 1. A still further safeguard against accidental movement or vibration of the license plate when in its assembled position is to impart a slight inward bend to the center of the longitudinal member 1, as shown in 20, whereby the member contacts with the plate 13 in positive manner.

The modification shown in Fig. 1 is peculiarly adapted for use at the rear of the machine, where the license plate and its holder depend from their support. In this instance the member 1 has the transverse members 2 secured thereto adjacent their upper ends, and differs from the form shown in Fig. 1 only in this respect. The resulting position of the license plate and holder with respect to their holder is obvious. The same result can be obtained in the universal form of the invention shown in Fig. 5 by means of the slots 18.

It is readily understood that the invention is susceptible to numerous modifications and adaptations and it is intended that it be limited only by the scope of the accompanying claims.

1. A license plate holder comprising a longitudinal member, transverse members secured to said longitudinal member adjacent the ends thereof, fixed lugs extending upwardly and outwardly from the said transverse members adjacent the upper ends thereof for engaging corresponding slots in said license plates, and clamps pivotally mounted on the said transverse members adjacent the lower ends thereof, for releasably but securely clamping the plate in place after the engagement of its slots with the said fixed lugs.

2. A license plate holder comprising a longitudinal member, transverse members secured to said longitudinal member adjacent the ends thereof, fixed lugs extending upwardly and outwardly from the said transverse members adjacent the upper ends thereof for engaging corresponding slots in said license plates, studs on said transverse members adjacent the lower ends thereof, for engaging with the lower slots in the license plate, and clamps pivotally mounted on said transverse members adjacent the lower ends thereof for releasably but securely clamping the plate after the engagement of its upper slots with the said fixed lugs, the said clamps when in their clamping position concealing the lower slots and the studs.

3. A license plate holder comprising a longitudinal member by means of which the holder can be secured to a vehicle, the said longitudinal member having an inward bend substantially at the center thereof, whereby it positively contacts with the license plate, to tend to hold it rigidly in place, at least one transverse member secured to said longitudinal member, and means on said transverse member for releasably but firmly clamping the license plate in place.

4. A license plate holder comprising a longitudinal member; the said member having longitudinal slots arranged one on each side of the center thereof, means slidable in said slots for securing said holder to a vehicle, transverse members secured to said longitudinal members, and means on said transverse members for releasably but firmly clamping the license plate in place.

5. A license plate holder comprising a longitudinal member, longitudinal slots arranged one on each side of said longitudinal members, means adjustable in and extending through each of said slots, whereby the said longitudinal member may be secured to a vehicle, additional longitudinal slots arranged one on each side of said longitudinal members, transverse members each having a longitudinal slot therein, the said last mentioned slots each forming a cooperating set with the adjacent one of the last mentioned series of slots on the said longitudinal member, means extending through and adjustable in each of said sets of slots whereby the transverse members may be adjusted both longitudinally and transversely of said longitudinal member to adapt them to various sizes of license plates, and means on each of said transverse members for releasably but firmly clamping the license plate in place.

In testimony whereof I have signed my name to this specification.

LEON H. FUSMER. [L. S.]